United States Patent [19]

Nakagawa et al.

[11] Patent Number: 5,120,438

[45] Date of Patent: Jun. 9, 1992

[54] LIQUID PURIFYING DEVICE INCORPORATING AIR PUMPING MEANS WITHIN CONTAINER LID BODY

[75] Inventors: Makoto Nakagawa, Ama; Masashi Endo, Gujo, both of Japan

[73] Assignee: Tomei Sangyo Co., Ltd, Japan

[21] Appl. No.: 686,371

[22] Filed: Apr. 17, 1991

[30] Foreign Application Priority Data

Jun. 5, 1990 [JP] Japan ................. 2-59423[U]

[51] Int. Cl.$^5$ ................. B01D 35/00; B01D 63/00
[52] U.S. Cl. ................. 210/256; 210/258; 210/321.8; 210/321.89; 210/416.1; 210/435; 210/454; 222/189; 222/209
[58] Field of Search ............. 210/483, 321.8, 321.89, 210/295, 435, 439, 441, 454, 416.1, 256, , 256, 258; 222/189, 209

[56] References Cited

U.S. PATENT DOCUMENTS

| | | | |
|---|---|---|---|
| 4,344,548 | 8/1982 | Frazier | 222/209 |
| 4,426,285 | 1/1984 | Davis | 210/109 |
| 4,713,173 | 12/1987 | Bray | 210/259 |
| 4,714,550 | 12/1987 | Malson et al. | 210/244 |
| 4,940,542 | 7/1990 | Simizu et al. | 210/321.8 |

FOREIGN PATENT DOCUMENTS

| | | |
|---|---|---|
| 0230968 | 8/1987 | European Pat. Off. . |
| 0338844 | 10/1989 | European Pat. Off. . |
| 3238558A1 | 4/1984 | Fed. Rep. of Germany . |
| 62-90706 | 6/1987 | Japan . |
| 62-125804 | 6/1987 | Japan . |

Primary Examiner—Robert A. Dawson
Assistant Examiner—Ana Fortuna
Attorney, Agent, or Firm—Parkhurst, Wendel & Rossi

[57] ABSTRACT

A liquid purifying device for dispensing a liquid, including a container which has an interior space for storing a liquid, and a lid member for closing the interior space. The liquid is delivered out of the container, due to a pressure of a compressed air which is introduced into the interior space by air pumping means. The air pumping means includes a cylinder member which is reciprocated between an advanced position and a retracted position. The cylinder member is normally biased toward the advanced position, but may be held in the retracted position where appropriate. The lid member of the container has a liquid delivery path through which the liquid is delivered as desired, when a valve disposed in the path is placed in its open position upon pressing of a push-operated member. In the liquid delivery path, there is provided a filter adapted to remove bacteria from the liquid delivered through the path.

17 Claims, 8 Drawing Sheets

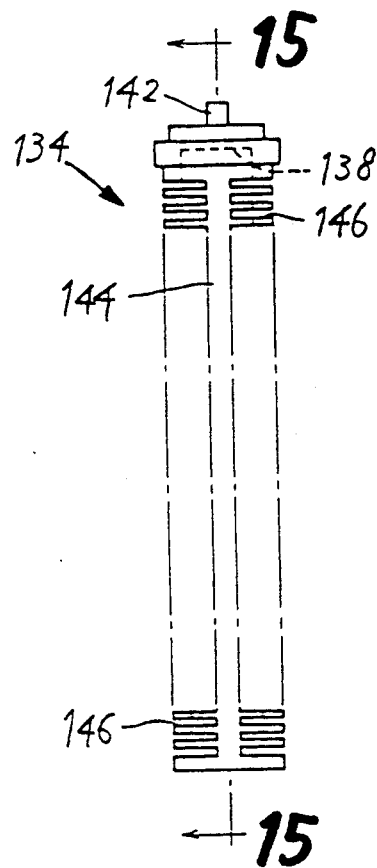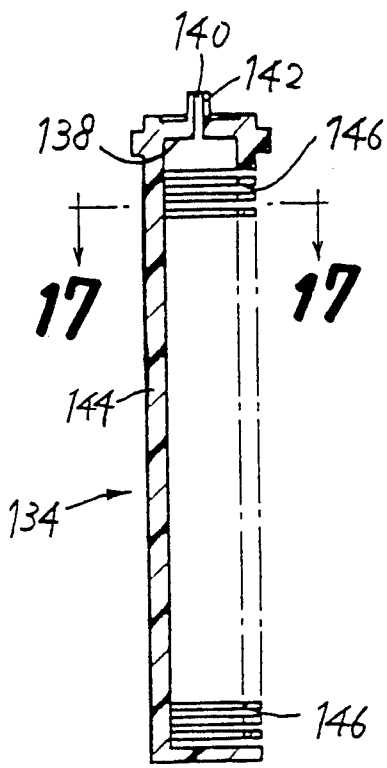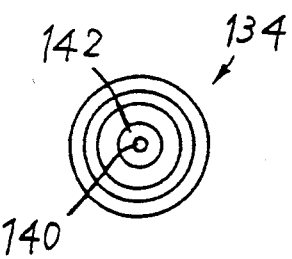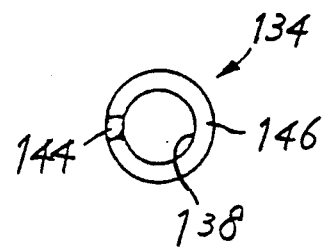

LIQUID PURIFYING DEVICE INCORPORATING AIR PUMPING MEANS WITHIN CONTAINER LID BODY

BACKGROUND OF THE INVENTION

1. Field of the Invention

The present invention relates to a device which permits easy delivery of a sterile water or pharmaceutical liquid used in the fields of medical treatment, health and hygienics or sanitation, biochemistry, bacteriology, or in the fields associated with foods and drinks and cosmetics. More particularly, the present invention is concerned with such a liquid purifying device which is suitably used for dispensing solutions for soaking, cleaning or storing contact lenses.

2. Discussion of the Prior Art

Various aqueous solutions, pharmaceutical liquids or liquid drugs are used in the fields of medical treatment, health and hygienics, biochemistry and bacteriology, for example. Examples of such liquids include pharmaceutical liquids used in medical institutions such as hospitals, and soaking or cleaning solutions for contact lenses. The liquids are generally purchased as accommodated in comparatively large containers, and are dispensed in desired amounts when needed, for a relatively long period. The containers have liquid delivery outlets through which the liquids are delivered. This arrangement for delivery or dispensation of the liquids suffers from contamination of the liquids by bacteria or microorganisms which may come into the containers through the liquid delivery outlet.

In view of the above drawback, there were developed two types of liquid purifying devices as disclosed in laid-open Publication Nos. 62-125804 and 62-90706 of unexamined Japanese Patent Application and unexamined Japanese Utility Model Application, respectively. The assignee of the present application contributed to the development of these devices. These devices use a container for accommodating a liquid, and a micro-porous membrane filter disposed in a liquid delivery path through which the liquid is delivered out of the container. The container is formed of a suitable elastic material so that the container body is elastically contracted, by squeezing hand pressure, to deliver the liquid, and is elastically restored to its original shape upon releasing of the hand pressure. The micro-porous membrane filter permits the liquid to flow therethrough but inhibits passage of bacteria therethrough. In this device, the bacteria contained in the liquid are removed by the micro-porous membrane filter provided in th liquid delivery path, when the liquid is delivered or dispensed from the container. Accordingly, even the liquid which is contaminated by bacteria within the container may be purified so that the liquid as dispensed may be made sterile.

In the proposed liquid purifying devices, however, the liquid delivery path or passage for delivering the liquid from the container is held exposed to the ambient atmosphere. Therefore, the interior of the liquid delivery passage, and the micro-porous membrane filter disposed therein may be contaminated by bacteria introduced through the exposed end of the passage. In particular, the proposed liquid purifying devices suffer from the problem that the bacteria may easily enter the liquid delivery passage, together with a flow of the ambient air into the interior of the container through the liquid delivery passage, due to a comparatively reduced pressure within the container, which is developed when the contracted container is elastically restored to its original shape.

To solve the above-described problem, another liquid purifying device as disclosed in U.S. Pat. No. 4,940,542 was developed by the assignee of the present invention. This device includes a first valve for permitting a supply flow of a compressed gas or a liquefied gas therethrough into the interior space of the container, but inhibiting a discharge flow of the gas and the liquid therethrough out of the interior space. The device further includes a second valve disposed between an outlet of the liquid delivery path and a micro-porous membrane provided in the path, for selectively closing and opening the liquid delivery path. The device also includes dispensing means of a push-operated type, which is manually operated to selectively open and close the second valve.

In the proposed liquid purifying device, the compressed or liquefied gas is introduced through the first valve into the interior space of the container, and the liquid delivery path is closed by the second valve while the liquid is not delivered. This arrangement effectively prevents the entry of bacteria through the liquid delivery outlet toward the micro-porous membrane. Accordingly, the proposed device is capable of dispensing the liquid in a sterile condition, for a prolonged period of time, with high liquid purifying stability, as compared with the conventional device without the first and second valve. Further, the use of the push-operated dispensing means makes it considerably easy to dispense or deliver the liquid from the container through the liquid delivery path. Namely, the opening of the second valve for dispensing the liquid can be effected only by pushing down the dispensing means. While the liquid is not delivered, the second valve is automatically placed in its closed position so as to close or shut the liquid delivery path. Thus, the push-operated dispensing means is considerably easy to handle.

In the thus constructed liquid purifying device, however, where the container includes as an integral part a rubber bulb or other means for supplying the pressurized gas into the interior space of the container through the first valve, this pressurized-gas supply means may interfere with the operation of the push-operated dispensing means for opening and closing the second valve, owing to the relative positions of the supply valve and the dispensing means. In this respect, it is desirable that both of the pressurized-gas supply means and the dispensing means are installed on the upper lid portion of the device, to assure improved ease of handling or manipulation of the two means. When the gas supply means is located near to the dispensing means in the relatively narrow lid portion, the operation of one of the two means is inevitably disturbed by the presence of the other means.

SUMMARY OF THE INVENTION

The present invention was made in view of the prior art situations described above. It is accordingly an object of the present invention to provide a liquid purifying device for dispensing a sterile liquid, which employs a push-operated dispenser that permits easy delivery of the liquid through a liquid delivery passage, and wherein the dispenser and means for supplying a compressed gas into the interior of the device are both mounted on a lid portion of the device, without mutual operational interference or disturbance thereof.

The above object may be accomplished according to the principle of the present invention, which provides a liquid purifying device for dispensing a liquid, comprising (a) a container having an interior space for storing a mass of the liquid, the container including a lid member for fluid-tightly closing an opening of the interior space; (b) air pumping means provided on the lid member, for introducing and compressing air and supplying the compressed air into the interior space of the container through an air inlet passage, the air pumping means including a cylinder member which is reciprocated between a fully advanced position in which the cylinder member protrudes from the lid member, and a fully retracted position in which the cylinder member is received in the lid member; (c) means for biasing the cylinder member toward the fully advanced position; (d) holding means for holding the cylinder member in the fully retracted position against a biasing force of the biasing means; (e) first valve means disposed in the air inlet passage, for permitting a supply flow of the compressed air therethrough into the interior space to raise a pressure within the interior space, and for inhibiting a discharge flow of the compressed air and the liquid therethrough out of the interior space; (f) a liquid delivery path which extends through the lid member so as to communicate at one end thereof with the interior space and at the other end with an exterior space of the container, the liquid being delivered out of the interior space through the liquid delivery path, due to the pressure of the compressed air within the interior space; (g) filtering means disposed in the liquid delivery path and submerged in the mass of the liquid, for filtering the liquid to remove bacteria from the liquid delivered through the liquid delivery path; (h) second valve means disposed in a portion of the liquid delivery path which is downstream of the filtering means, as viewed in a direction of delivery of the liquid, the second valve means having a closed and an open position for closing and opening the liquid delivery path, respectively; and (i) dispensing means for operating the second valve means between the closed and open positions, the dispensing means comprising a push-operated member received in the lid member and having an operating surface exposed to the exterior space of the container.

In the liquid purifying device of the present invention constructed as described above, the second valve means for selectively opening and closing the liquid delivery path is operated by the dispensing means having the push-operated member. Namely, the second valve means is placed in its open position for dispensing the liquid, merely by depressing the push-operated member. Thus, the delivery of the liquid may be considerably simplified.

According to the present invention, the air pumping means for supplying the compressed gas into the container may be incorporated within the liquid purifying device, without significantly increasing the size of the device. Further, in an air pumping operation, the cylinder member of the air pumping means which has been pushed down to the fully retracted position is automatically elevated to the fully advanced position by the biasing means, assuring improved ease of handling of the air pumping means. When the push-operated member of the dispensing means is operated, on the other hand, the cylinder member is held in the fully retracted position by the holding means, that is, the cylinder member is received within the lid member, whereby the air pumping means does not interfere with the operation of the push-operated member. Thus, the air pumping means and dispensing means can be readily operated without mutual interference, even if both means are located close to each other on the lid member.

In one form of the present invention, the lid member has an annular groove, and the cylinder member is received in the annular groove such that the cylinder member is movable relative to the lid member, between the fully retracted position and the fully advanced position.

In another form of the invention, the holding means includes an engaging member fixed to the lid member, and an L-shaped groove formed in an outer circumferential surface of the cylinder member. The cylinder member is held in the fully retracted position when the engaging member engages a lateral portion of the L-shaped groove.

In a further form of the invention, the liquid delivery path includes a through-hole formed through the lid member. The above-indicated push-operating member is received in an upper portion of the through-hole. The liquid delivery path may further include an L-shaped passage formed through the push-operated member. The L-shaped passage includes a vertical portion which communicates with the through-hole, and a lateral portion which is open to the exterior space.

BRIEF DESCRIPTION OF THE DRAWINGS

The foregoing and optional objects, features and advantages of the present invention will be better understood by reading the following detailed description of presently preferred embodiments of the invention, when considered in connection with the accompanying drawings, in which:

FIG. 14 is a view depicting a cylindrical support of a filtering assembly used in the device of FIG. 13;

FIG. 15 is a cross sectional view taken along line 15—15 of FIG. 14;

FIG. 16 is a plan view of the cylindrical support of FIG. 14;

FIG. 17 is a cross sectional view taken along line 17—17 of FIG. 15;

DETAILED DESCRIPTION OF THE PREFERRED EMBODIMENTS

Figure 1:
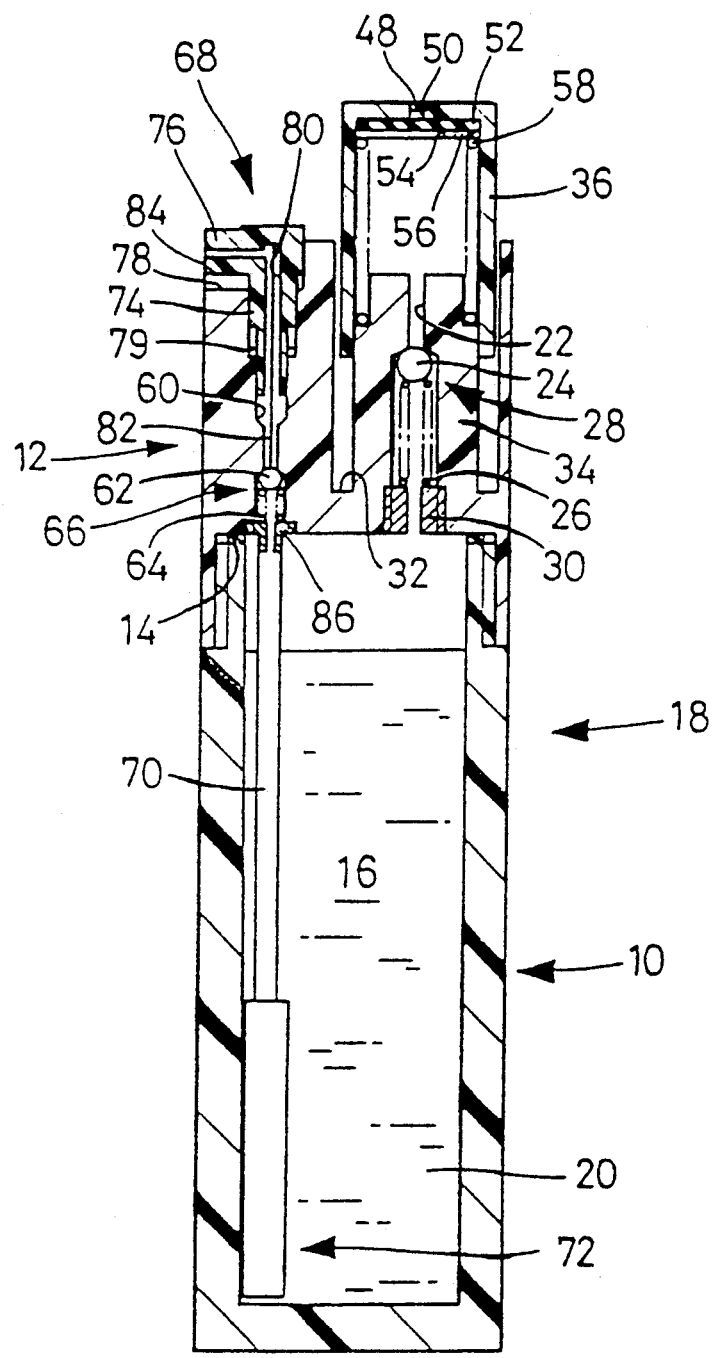
FIG. 1 is a schematic elevational view in longitudinal cross section of a liquid purifying device constructed according to one embodiment of the invention.

Referring first to FIG. 1 which shows a liquid purifying device as one embodiment of the present invention, reference numeral 10 denotes a cylindrical container body which is closed at its lower end and has an externally threaded upper end portion adjacent to an open end thereof. Reference numeral 12 denotes a covering member in the form of a lid body having a cylindrical shape closed at its upper end. The lid body 12 consists of a relatively thick-walled bottom wall portion, and an internally threaded cylindrical portion which is held in engagement with the externally threaded upper end portion of the container body 10, with a packing 14 sandwiched under pressure between the two bodies 10, 12. Thus, the opening of the container body 10 is fluid-tightly closed by the lid body 12, to thereby provide a container 18 having an enclosed interior storage space 16 in which a mass of a liquid 20 is stored.

The container body 10 and lid body 12 may be formed of any known material, such as resin, glass and ceramics, which is usually used for a known container, as long as the selected material for these bodies 10, 12 does not affect and is not affected by the liquid 20 stored in the container 18.

The lid body 12 of the container 18 has an air inlet passage 22 formed through the bottom wall portion thereof in the longitudinal direction of the container 18. The air inlet passage 22 is spaced by a suitable distance from the radial center of the lid body 12. In the longitudinally middle portion of the air inlet passage 22, there is provided first valve means in the form of a check valve 28 which consists of a ball 24 and a spring 26. This check valve 28 permits a compressed gas (air) to be introduced into the storage space 16 through the air inlet passage 22, while inhibiting a discharge flow of the compressed gas and the liquid through the air inlet passage 22. In FIG. 1, reference numeral 30 denotes a spring seat which is screwed in an open end portion of the air inlet passage 22 on the side of the storage space 16.

The bottom wall portion of the lid body 12 further has an annular groove 32 having a suitable depth, such that the air inlet passage 22 is located at the radial center of the annular groove 32, and such that the groove 32 is open in the outer surface of the lid body 12, i.e., the upper surface of the container 18. In this arrangement, the lid body 12 is formed with a columnar protrusion 34 having an outer circumferential surface which is defined by the annular groove 32. On this columnar protrusion 34 of the lid body 12, there is disposed a cylinder member 36 having a bottom wall at its upper end, such that a cylindrical portion of the cylinder member 36 is slidably fitted on the outer circumferential surface of the columnar protrusion 34.

Figure 3:
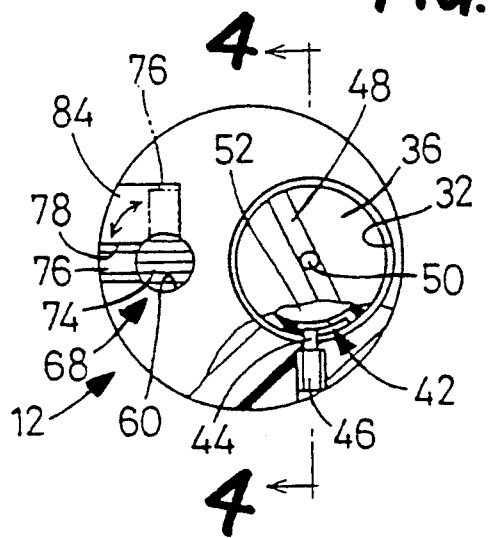
FIG. 3 is a partly cut-away plan view of the liquid purifying device of FIG. 1.
Figure 4:
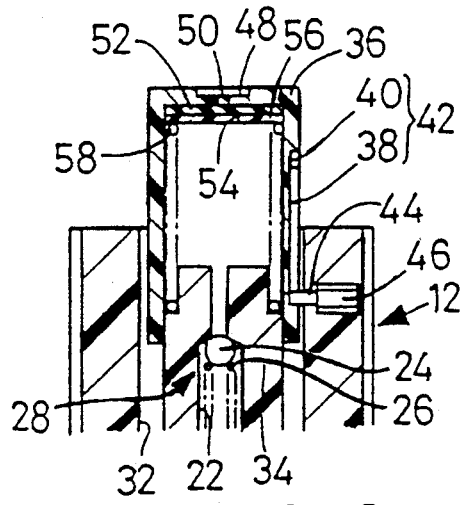
FIG. 4 is a fragmentary elevational view in cross section of the device, taken along line 4—4 of FIG. 3.
Figure 5:
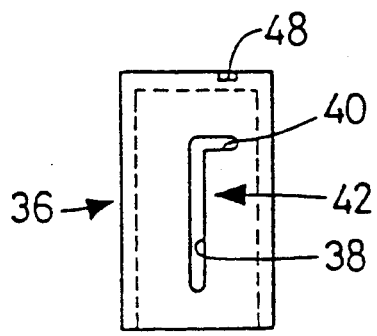
FIG. 5 is a view depicting a cylinder member of the device of FIG. 1.

In the present embodiment, the cylinder member 36 serves as an operating portion of air pumping means for supplying the compressed air into the interior storage space 16 through the air inlet passage 22. As shown in FIGS. 3 through 5, an inverted L-shaped guide groove 42 is formed on the outer circumferential surface of the cylinder member 36. This guide groove 42 consists of a vertical portion 38 which extends in the longitudinal direction of the cylinder member 36, and a lateral portion 40 which extends in the circumferential direction of the cylinder member 36 from the upper longitudinal end of the vertical portion 38. On the other hand, a screw member 46 is fixed to a portion of the lid body 12 which is spaced by the annular groove 32 from the outer circumferential surface of the columnar protrusion 34. The screw member 46 has an integrally formed engaging pin 44 which protrudes from the lid body 12 into the guide groove 42 of the cylinder member 36. With the engaging pin 44 of the screw member 46 slidably engaging the vertical portion 38 of the guide groove 42, the cylinder member 36 is adapted to be reciprocated between a fully retracted position in which the upper end face of the cylinder member 36 is substantially flush with the upper surface of the lid body 12, and a fully advanced position in which the cylinder member 36 protrudes from the upper end face of the lid body 12 by a suitable distance. FIGS. 1 and 4 show the cylinder member 36 when it is placed in the fully advanced portion. With the engaging pin 44 of the screw member 46 being held in engagement with the lateral portion 40 of the groove 42, the cylinder member 36 is held in the fully retracted position in which the cylinder member 36 is received within the lid body 12.

Figure 6:
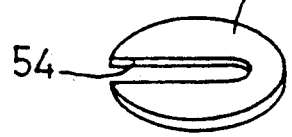
FIG. 6 is a perspective view showing a retainer plate used in the device of FIG. 1.

The cylinder member 36 has a groove 48 which is formed in the outer surface of the bottom wall thereof in the diametrical direction, so that the outer surface is divided by the groove 48 into two semicircular sections. The cylinder member 36 also has an air inlet 50 formed through the thickness of the bottom wall thereof, such that the air inlet 50 communicates with the groove 48 and the interior of the cylinder member 36. On the inner or lower surface of the bottom wall of the cylinder member 36, there is disposed a disc-like sealing member 52 made of an elastic material such as rubber, which is adapted to close the lower opening of the air inlet 50. On the sealing member 52 is disposed a disc-like retainer plate 56 (FIG. 6), which cooperates with the bottom wall of the cylinder member 36 to sandwich the sealing member 52 therebetween. This retainer plate 56 has a slot 54 which extends from its periphery in a diametrical direction, such that the air inlet 50 of the cylinder member 36 is aligned with the slot 54 as viewed in the direction perpendicular to the plane of the plate 56. Between the retainer plate 56 and a shoulder surface formed on the columnar protrusion 34 of the lid body 12, there is provided a spring 58 adapted to bias the cylinder member 36 toward the fully advanced position indicated above.

Accordingly, the cylinder member 36 is normally held in the fully advanced position, that is, protrudes by a given distance from the upper surface of the lid body 12, as shown in FIG. 1, while the engaging pin 44 of the screw member 46 is held in engagement with the lower end of the vertical portion 38 of the guide groove 42. When the cylinder member 36 is pushed down toward the fully retracted position, the sealing member 52 adheres to the bottom wall of the cylinder member 36 so as to close the lower opening of the air inlet 50, whereby the air in the interior of the cylinder member 36 is compressed. The compressed air is then fed to the interior storage space 16 of the container 18, through the check valve 28 described above, so as to raise the pressure of the air in the storage space 16.

Upon releasing the force applied to the cylinder member 36 for holding the cylinder member 36 in the fully retracted position, the cylinder member 36 is elevated to the fully advanced position under the biasing force of the spring 58. During this movement, the sealing member 52 is elastically deformed so that a portion of the member 52 is received in the slot 54 of the retainer plate 56, whereby the interior space of the cylinder member 36 is brought into fluid communication with the air inlet 50 exposed to the atmosphere. Consequently, the ambient air is introduced into the interior space of the cylinder member 36, through the air inlet 50.

Thus, the cylinder member 36 is manually pushed down to the fully retracted position, and is automatically elevated to the fully advanced position by means of the spring 58. By repeated downward and upward movements of the cylinder member 36 between the fully retracted and fully advanced positions, the compressed air is introduced by degrees into the interior storage space 16 of the container 18, so that the pressure within the storage space 16 can be sufficiently raised. It will be understood from the above description that the cylinder member 36, sealing member 52 and other members constitute the above-indicated air pumping means for supplying the compressed air into the interior storage space 16 through the air inlet passage 22. It will be also understood that the guide groove 42 and the screw member 46 having the engaging pin 44 constitute means for holding the cylinder member 36 in the fully retracted position against the biasing force of the spring 58, while the spring 58 serves as means for biasing the cylinder member 36 toward the fully advanced position.

The lid body 12 further has a through-hole 60 formed in the longitudinal direction through the thickness of the bottom wall portion thereof, like the air inlet passage 22, as shown in FIG. 1. Within the lower portion of the through-hole 60, there is disposed a check valve 66 consisting of a ball 62 and a spring 64. The check valve 66 functions to selectively open and close a liquid delivery path which will be described later. That is, the check valve 66 is selectively placed in an open position for permitting a discharge flow of a fluid from the interior storage space 16 through the through-hole 60, and in a closed position for inhibiting the fluid flow through the through-hole 60. A dispensing head 68 is fitted in the upper end portion of the through-hole 60, which is open to the atmosphere. This dispensing head 68 is a push-operated member which is manually pushed down so as to place the check valve 66 in the open position. A tube 70 is connected at one end to the lower end portion of the through-hole 60 which is open to the interior storage space 16. The tube 70 is connected at the other end to a filter 72 which in turn is connected to a filter 72 in the form of a micro-porous membrane known in the art, such as an array of hollow fibers or a planar membrane. When the check valve 66 is moved to the open position with the dispensing head 68 being manually pushed down, the liquid stored in the interior storage space 16 is delivered out of the container 18, through the filter 72, tube 70 and through-hole 60, based on the pressure within the storage space 16 which is raised by the compressed air that is fed into the space 16 by operating the cylinder member 36.

Figure 2:
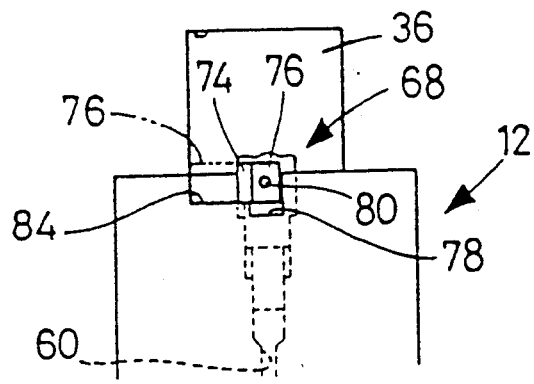
FIG. 2 is a fragmentary side view of the device, as seen from the left-hand side of FIG. 1.

More specifically, the dispensing head 68 includes a stepped cylindrical portion 74 which consists of an upper large-diameter section, an intermediate middle-diameter section and a lower small-diameter section, and a nozzle portion 76 which extends sidewise from the upper large-diameter section of the cylindrical portion 74, as shown in FIGS. 2 and 3. On the other hand, the through-hole 60 of the lid body 12 has an upper half in the form of a stepped cylindrical portion having three sections which correspond to the above-indicated three sections of the stepped cylindrical portion 74 of the dispensing head 68. As shown in FIGS. 1 and 2, a first recess 78 is formed in a portion of the lid body 12 adjacent to the upper open end of the through-hole 60, such that the nozzle portion 76 of the dispensing head 68 is received in the first recess 78. The first recess 78 communicates with the upper large-diameter section of the stepped cylindrical portion of the through-hole 60, and is open on the outer surface of the lid body 12. With the nozzle portion 76 being received within the first recess 78, the three sections of the stepped cylindrical portion 74 of the dispensing head 68 are slidably fitted in the corresponding three sections of the stepped cylindrical portion of the through-hole 60, so that the upper opening of the through-hole 60 is fluid-tightly closed by the dispensing head 68. Between the middle-diameter section of the dispensing head 68 and a portion of the lid body 12 which defines the middle-diameter section of the through-hole 60, there is provided an O-ring 79 which functions to maintain fluid-tightness between the head 68 and the lid body 12.

The dispensing head 68 has an inverted L-shaped passage 80 which consists of a vertical portion formed in the stepped cylindrical portion 74, and a lateral portion formed through the nozzle portion 76. That is, the L-shaped passage 80 is formed through the dispensing head 68 so as to communicate with the through-hole 60 and the exterior space. The dispensing head 68 also has an operating rod 82 whose diameter is sufficiently smaller than that of the vertical portion of the L-shaped passage 80 of the dispensing head 68, and that of the through-hole 60 of the lid body 12. This operating rod 82 abuts at its upper end on the bottom wall of the vertical portion of the L-shaped passage 80, and at its lower end on the upper surface of the ball 62 of the check valve 66. When the dispensing head 68 is depressed to its operated position, the force applied to the head 68 is transmitted to the ball 62 of the check valve 66, through the operating rod 82, so that the check valve 66 is brought into the open position. While the dispensing head 68 is placed in its non-operated or original position, the biasing force of the spring 64 of the check valve 66 acts on the dispensing head 68 through the ball 62 and the operating rod 82, so that the head 68 is maintained at its original position, which is spaced by a given distance from the operated position indicated above, in the upward direction.

Namely, the check valve 66 is normally held in the closed position under the biasing force of the spring 64 while the dispensing head 68 is placed in the original position, whereby the liquid 20 stored in the interior storage space 16 is prevented from being delivered out of the container 18. When the dispensing head 68 is finger-pressed to its operated position, the check valve 66 is moved to the open position against the biasing force of the spring 64, so that the liquid stored in the storage space 16 is delivered out of the container 18, through the filter 72, tube 70, through-hole 60 and L-shaped passage 80, under the elevated pressure in the space 16. With the finger pressure released from the head 68, the check valve 66 is automatically placed in the closed position while the liquid 20 in the storage space 16 is not delivered, such that the filter 72 is disconnected from the exposed end of the L-shaped passage 80 which is open to the atmosphere.

It will be understood from the above description that the liquid delivery path of the present embodiment consists of the filter 72, tube 70, through-hole 60 and L-shaped passage 80, and communicates at one end thereof with the interior storage space 16, and at the other end with the exterior of the container 18. The check valve 66 disposed in the through-hole 60 serves as second valve means for selectively closing and opening the liquid delivery path. Further, the dispensing head 68 and the operating rod 82 constitute dispensing means for operating the check valve 66 as the second valve means between the open and closed positions.

In the present embodiment, the lid body 12 further has a second recess 84 which is formed in its portion adjacent to the upper open end of the through-hole 60, such that the second recess 84 cooperates with the first recess 78 indicated above to provide a stepped depression in which the nozzle portion 76 of the dispensing head 68 may be pivoted about the axis of the cylindrical portion 74 between two positions corresponding to the two recesses 78, 84. The second recess 84 has a depth which is smaller by a given distance than that of the first recess 78. That is, the bottom wall of the second recess 84 is almost in alignment with the lower surface of the nozzle portion 76 when the dispensing head 68 is placed in its original position, i.e., when the head 68 is in the non-depressed or non-operated position. Accordingly, the dispensing head 68 is prevented from being depressed, by pivoting the dispensing head 68 so that the nozzle portion 76 is received in the second recess 84. While the liquid 20 is not delivered, especially when the compressed air is fed into the interior storage space 16 by means of the cylinder member 36, it is desirable that the dispensing head 68 be received in the second recess 84, and prevented from being depressed or operated. In this case, the check valve 66 will never be placed in the open position even if the dispensing head 68 is pressed by mistake, whereby delivery of the liquid 20 can be avoided.

In FIG. 1, reference numeral 86 denotes a spring seat which is screwed in the lower open end portion of the through-hole 60. In this embodiment, the tube 70 is connected to the spring seat 86.

In the present liquid purifying device, the cylinder member 36 as the air pumping means, and the dispensing head 68 as the dispensing means are both operated on the upper surface of the lid body 12. Therefore, the pressing of the dispensing head 68 for dispensing the liquid 20 may be obstructed by the cylinder member 36 which protrudes largely from the upper surface of the lid body 12 in its fully advanced position.

To solve the above problem, the cylinder member 36 is adapted to be entirely received within the lid body 12 while the member 36 is not in use, with the engaging pin 44 of the screw member 46 fixed to the lid body 12 held in engagement with the lateral portion 40 of the guide groove 42 of the cylinder member 36. In this arrangement, the cylinder member 36 does not interfere with the operation of the dispensing head 68 for dispensing the liquid 20, thereby permitting considerably easy delivery of the liquid 20 by means of the head 68.

In the liquid purifying device of the instant embodiment, the liquid 20 can be easily dispensed from the container 18 as desired, since the dispensing of the liquid 20 is effected only by pressing the dispensing head 68. While the liquid 20 is not delivered, i.e., while the dispensing head 68 is in the original position, the check valve 66 is placed in the closed position, and therefore the filter 72 is disconnected from the exposed open end of the liquid delivery path. Consequently, the filter 72 is effectively protected against contamination by bacteria which may otherwise come into the liquid delivery path through the exposed end thereof.

Further, the cylinder member 36 as the air pumping means is normally received within the lid body 12 while the member 36 is not in use, with the engaging pin 44 of the screw member 46 held in engagement with the lateral portion 40 of the guide groove 42. Accordingly, the cylinder member 36 and the dispensing head 68 can be readily operated independently of each other, even though these components 36, 68 are both provided in the upper portion of the lid body 12.

In the instant embodiment, while the liquid 20 is not delivered, the dispensing head 68 is desirably pivoted to the lock position on the side of the second recess 84, to prevent the delivery of the liquid 20 even when the head 68 is inadvertently pressed. Thus, the present liquid purifying device does not suffer from wasting of the liquid 20, for example, due to such inadvertent pressing of the dispensing head 68.

Referring next to FIGS. 7 through 12, there will be described another embodiment of the present invention. The liquid purifying device according to this embodiment is similar in basic construction to that of the preceding embodiment, except in some aspects which will be hereinafter described in detail. In the present embodiment, the same reference numerals as used in the preceding embodiment will be used for identifying structurally and/or functionally corresponding elements, and no detailed description of these elements will be provided.

In the liquid purifying device of this embodiment, the container body 10 having a cylindrical shape includes an upper end portion to which the lid body 12 is secured by ultrasonic welding, and a lower end portion to which an internally threaded bottom cap 88 is removably attached. The container body 10, the lid body 12 and the bottom cap 88 constitute a container 96 having the interior storage space 16 formed therein. A suitable liquid 20 is poured into the interior storage space 16, through the lower opening of the container body 10, while the bottom cap 88 is detached from the container body 10. Reference numeral 89 denotes an O-ring which serves to maintain fluid-tightness of the interior storage space 16. Reference numeral 90 denotes a top cap which covers the lid body 12.

In the instant embodiment, the air inlet passage 22 formed through the lid body 12 consists of an upper small-diameter portion and a lower large-diameter portion, between which is formed a shoulder surface in the form of a concave part-spherical surface. A disc-like valve member 92 made of an elastic material such as rubber is provided adjacent the part-spherical shoulder surface of the lid body 12. In the lower large-diameter portion of the air inlet passage 22, there is fixedly fitted a cylindrical retainer having a bottom wall on the side of the shoulder surface. The retainer 94 functions to hold the valve member 92 in position, such that the valve member 92 is kept adjacent the shoulder surface of the lid body 12.

Figure 7:
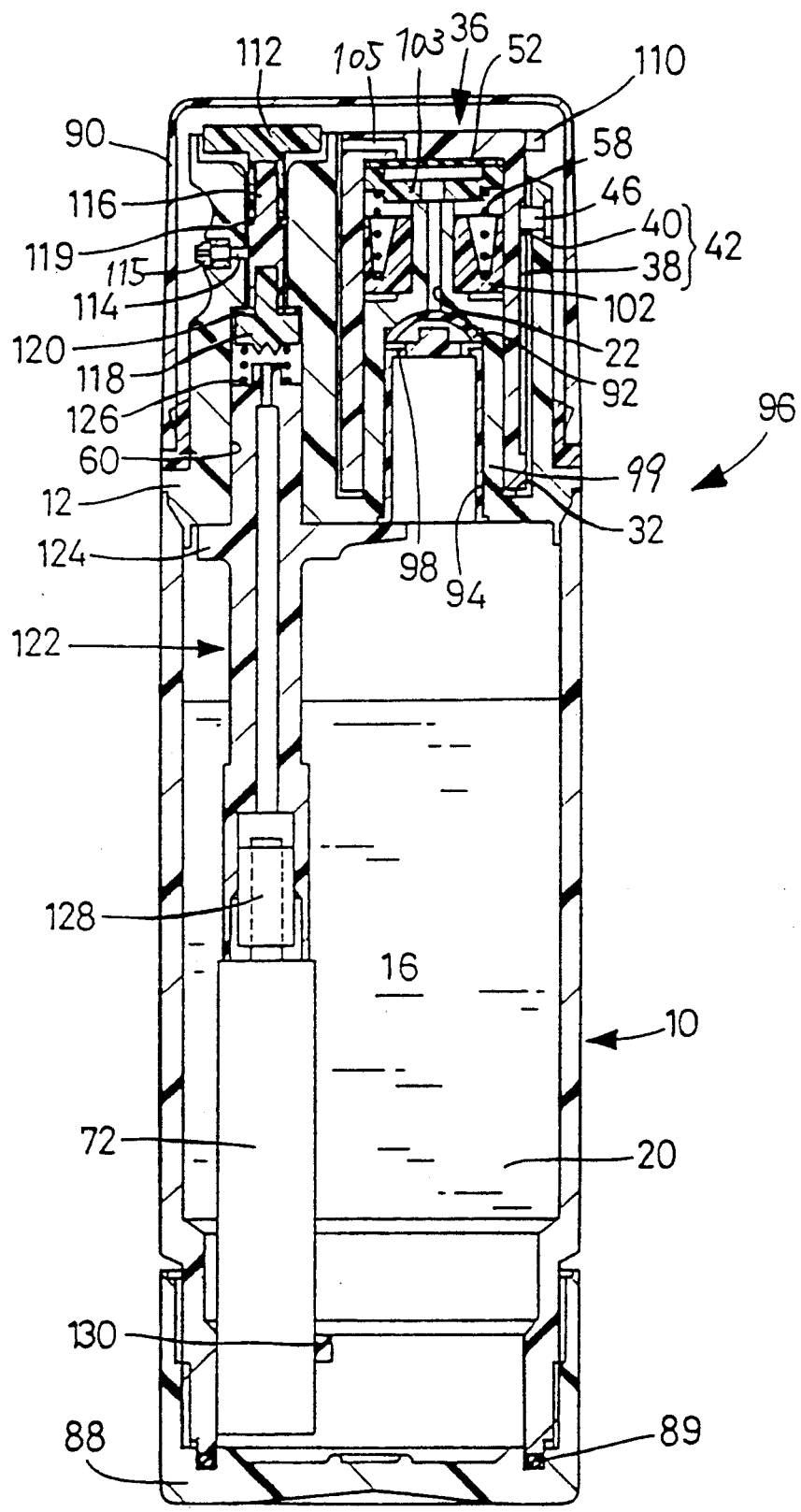
FIG. 7 is a schematic elevational view in longitudinal cross section of another embodiment of the liquid purifying device of the invention.
Figure 8:
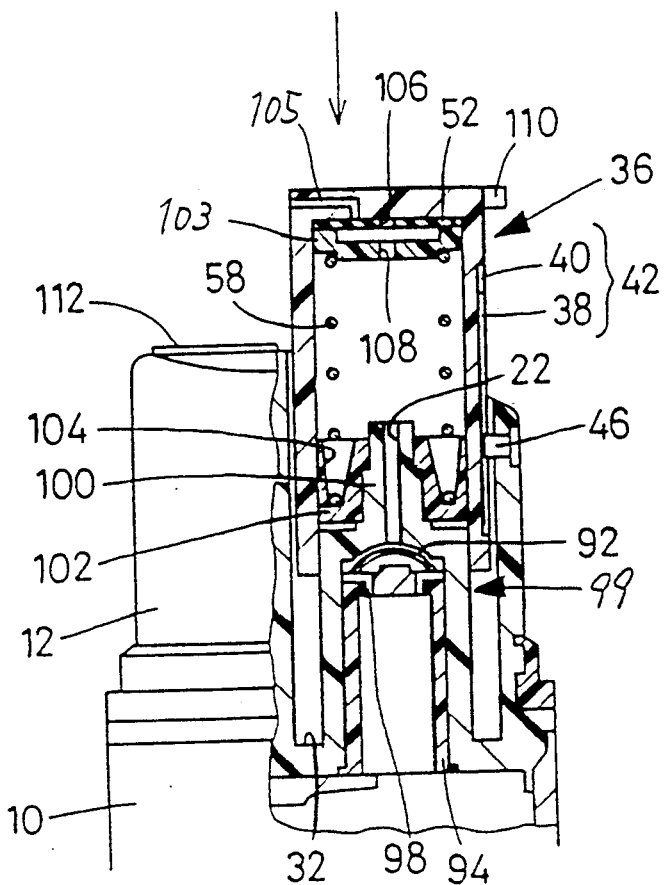
FIGS. 8 and 9 are elevational views partly in cross section showing air pumping means of the device of FIG. 7, FIG. 8 indicating a state of the air pumping means when moved toward its fully retracted position, and FIG. 9 indicating a state of the same when moved toward its fully advanced position by means of a spring.

The valve member 92 is elastically deformable or displaceable in the vertical direction by a predetermined distance, between the bottom wall of the retainer 94 and the part-spherical shoulder surface of the lid body 12. The valve member 92 is moved to the shoulder surface to close the air inlet passage 22, as shown in FIG. 7. When the valve member 92 is moved toward the retainer 94, the air inlet passage 22 is brought into communication with two holes 98 formed through the bottom wall of the retainer 94. As shown in FIG. 8, when the cylinder member 36 is pushed down, i.e., is moved from the fully advanced position to the fully retracted position, so as to supply a compressed air into the interior storage space 16, the valve member 92 is moved down toward the retainer 94, so that the compressed air is introduced from the passage 22 into the storage space 16 through a clearance between the shoulder surface and the valve member 92, and the holes 98 formed through the retainer 94. When the cylinder member 36 is then returned to the fully advanced position under the biasing force of the spring 58, the valve member 92 adheres to the shoulder surface to thereby close the air inlet passage 22, so as to inhibit a discharge flow of the liquid 20 and the air from the interior storage space 16 through the air inlet passage 22.

In the present embodiment, the lid body 12 has a protrusion 99 through which the air inlet passage 92 is formed, and upon which the cylinder member 36 is slidably fitted. This protrusion 99 includes an upper small-diameter portion 100 (FIGS. 8 and 9) upon which an annular spring seat 102 is fixedly fitted. On the other hand, the disc-like sealing member 52 is provided on the inner or lower surface of the bottom wall of the cylinder member 36, and a dish-shaped retainer plate 103 is provided on the sealing member 52 such that only a peripheral portion of the member 52 is gripped by and between a peripheral portion of the plate 103 and the bottom wall of the cylinder member 36. The spring 58 is disposed between an annular groove 104 formed in the spring seat 102 and the lower surface of the retainer plate 103, so as to bias the cylinder member 36 toward its fully advanced position. The cylinder member 36 has an air inlet 105 formed through the bottom wall thereof. The air inlet 105 is open at one end in the outer circumferential surface of the cylinder member 36, and at the other end in a portion of the inner surface of the bottom wall which is more or less offset from the center thereof. The sealing member 52 has a small hole 106 formed through the center thereof, and the retainer plate 56 also has a small hole 108 formed through the center thereof.

Figure 9:
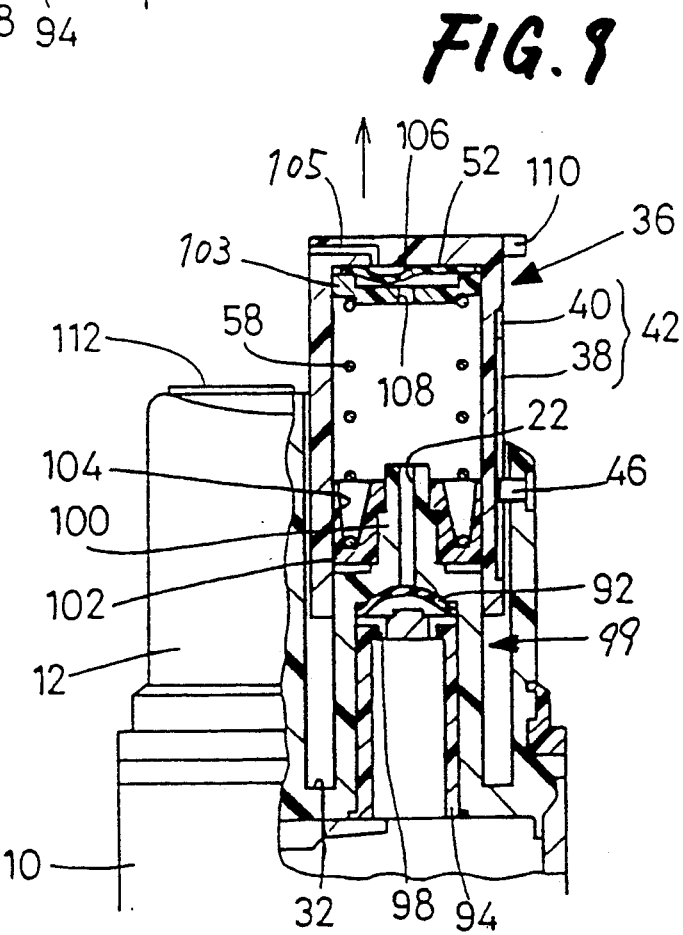

In an actual air pumping action, when the cylinder member 36 is pushed down to the fully retracted position, the sealing member 52 is forced against the inner surface of the cylinder member 36 so as to close the air inlet 105 and the hole 106, as shown in FIG. 8, whereby the air in the interior of the cylinder member 36 is compressed. When the cylinder member 36 is then returned to the fully advanced position, the sealing member 52 is elastically deformed so that the ambient air is introduced into the interior of the cylinder member 36, through the air inlet 105 and the holes 106, 108, as shown in FIG. 9. Thus, the compressed air is introduced into the interior storage space 16 by reciprocative movement of the cylinder member 36.

As in the preceding embodiment, the L-shaped guide groove 42 consisting of the vertical and lateral portions 38, 40 is formed on the outer circumferential surface of the cylindrical portion of the cylinder member 36. On the other hand, the screw member 46 is fixed to a portion of the lid body 12 which is aligned with the guide groove 42. To lock the cylinder member 36 in the fully retracted position, the cylinder member 36 is pushed down to the fully retracted position, and is rotated in that position, so that the screw member 46 engages the lateral portion 40 of the guide groove 42. Thus, the cylinder member 36 is held in the fully retracted position in which the member 36 is fully received within the lid body 12, against the biasing force of the spring 58, as shown in FIG. 7. In this arrangement, the container 96 may be made considerably compact, even though it incorporates the air pumping means (the cylinder member 36). Further, the air pumping means does not prevent the operation of the dispensing head 112 for delivering or dispensing the liquid 20.

Figure 10:
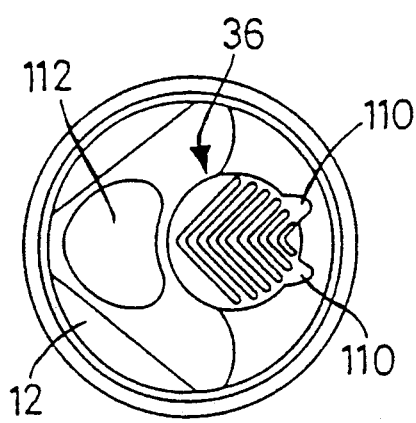
FIG. 10 is a top plan view depicting an upper surface of a lid body of the device of FIG. 7.
Figure 11:
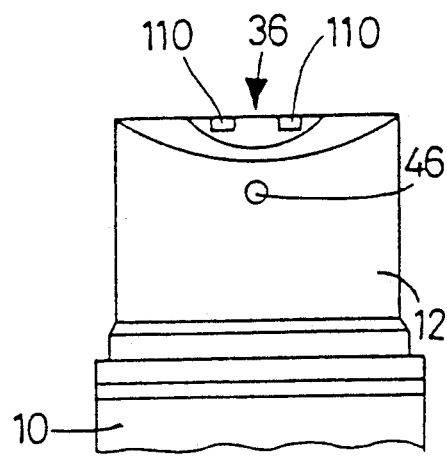
FIG. 11 is a fragmentary side view of the device, as seen from the right-hand side of FIG. 10.

As is apparent from FIGS. 10 and 11, the cylinder member 36 has integrally formed tabs 110, 110 which protrude radially outwardly from the periphery of the upper surface of the member 36. These tabs 110 facilitate the rotation of the cylinder member 36 to lock it in the fully retracted position.

Figure 12:
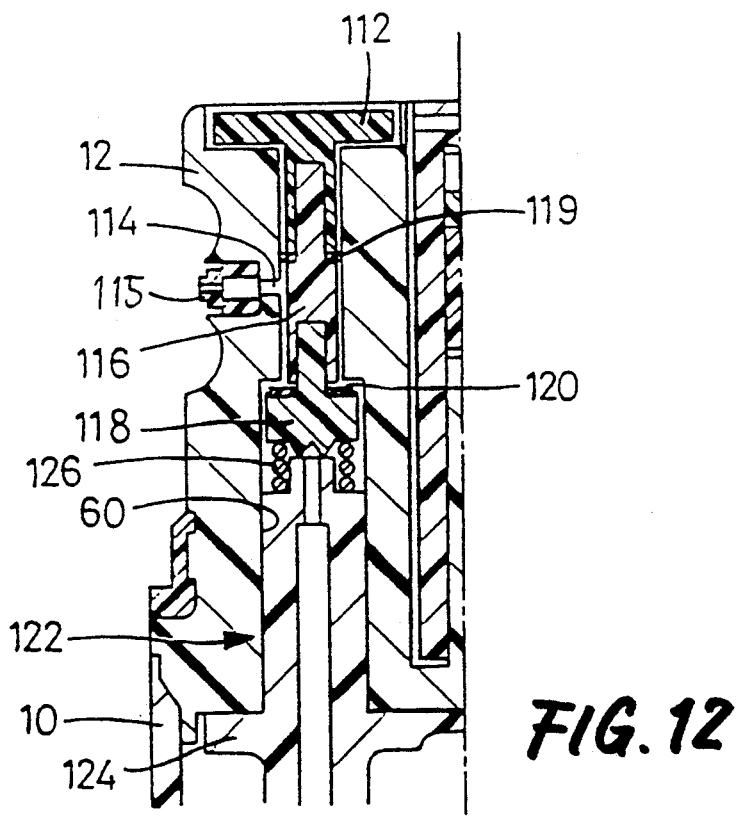
FIG. 12 is a fragmentary elevational view in cross section, showing dispensing means of the device of FIG. 7.
Figure 13:
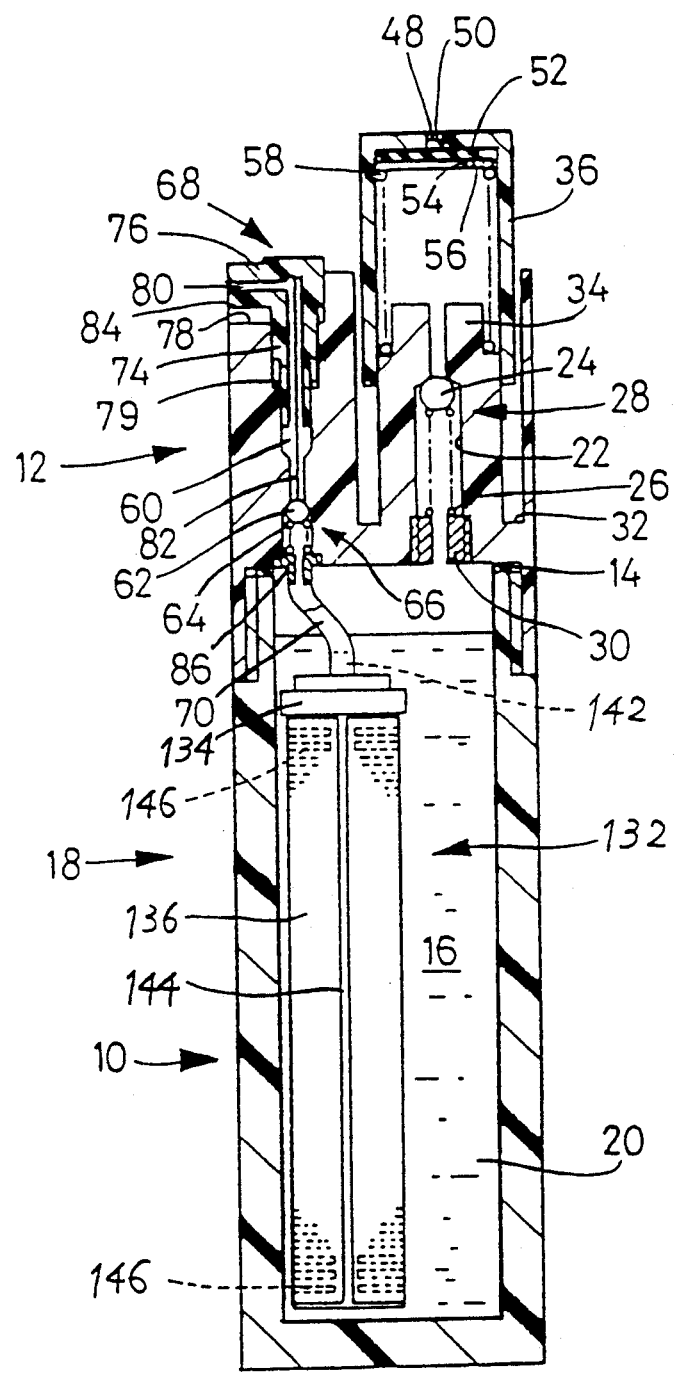
FIG. 13 is a schematic elevational view in longitudinal cross section of a further embodiment of the liquid purifying device of the invention.

Referring next to FIG. 12, the through-hole 60 formed through the lid body 12 in parallel with the air inlet passage 22 has a stepped configuration, i.e., consists of opposite large-diameter end portions which are open at its upper and lower ends, respectively, and a small-diameter portion formed therebetween. The lid body 12 has a nozzle aperture 114 formed through the side wall of the small-diameter portion of the through-hole 60, in the radial direction of the lid body 12. The nozzle aperture 114 is open to the atmosphere, through a nozzle 115 attached to the lid body 12, and communicates with the small-diameter portion of the through-hole 60. The nozzle aperture 114 constitutes the exposed open end of the liquid delivery passage of the container 96. A dispensing head 112 is substantially located in the upper large-diameter portion of the through-hole 60, and is fixed to a connecting member 116 which is disposed in the small-diameter portion of the hole 60. The connecting member 116 is in turn fixed to a spring seat 118 whose major portion is received in the lower large-diameter portion of the hole 60. Within the through-hole 60, there are provided an O-ring 119 between the dispensing head 112 and the connecting member 116, and an annular packing 120 between the connecting member 116 and the spring seat 118. The packing 120 is located below the shoulder surface of the lid body 12 which is formed between the intermediate small-diameter portion and the lower large-diameter portion of the through-hole 60. The packing 120 is dimensioned so as to close the opening of the small-diameter portion of the through-hole 60 exposed to the lower large-diameter portion. The nozzle aperture 114 formed in the lid body 12 is located between the O-ring 119 and the packing 120.

In the lower large-diameter portion of the through-hole 60, there is inserted a sleeve 122 made of a resin material. The sleeve 122 has an integrally formed flange 124 which protrudes radially outwardly from a longitudinally intermediate portion of the outer circumferential surface thereof, and which is secured to the lower surface of the lid body 12 by ultrasonic welding. Between the upper end face of the sleeve 122 and the lower surface of the spring seat 118, there is provided a spring 126 adapted to bias the dispensing head 112, connecting member 116 and spring seat 118 upwards. Under the biasing force of the spring 126, the packing 120 is pressed against the shoulder surface of the lid body 12, whereby the through-hole 60 is normally closed. The through-hole 60 permits a fluid to flow therethrough only when the dispensing head 112 is depressed so that the packing 120 is moved away from the shoulder surface of the lid body 12 against the biasing force of the spring 126.

In the present embodiment, the liquid 20 in the interior storage space 16 is delivered out of the container 96 through the liquid delivery path simply by depressing the dispensing head 112, as in the preceding embodiment. While the dispensing head 112 is not operated, the filter 72 which is connected to and supported by the lower portion of the sleeve 122 is disconnected from the nozzle 115 as an outlet of the liquid delivery path which is open to the atmosphere. Accordingly, the filter 72 is effectively protected against contamination by bacteria which may enter the liquid delivery path through the nozzle 115.

It will be understood from the above description that the spring 126, packing 120 and other components constitute the second valve means for selectively opening and closing the liquid delivery path, and that the dispensing head 112, connecting member 116, spring sheat 118 and others constitute the dispensing means for selectively opening and closing the second valve means so that the liquid 20 in the storage space 16 may be dispensed as desired.

The liquid delivery path through which the liquid 20 in the interior storage space 16 is delivered consists of inner bores of the filter 72 and sleeve 122, the through-hole 60 and the nozzle aperture 114. In FIG. 7, reference numeral 128 denotes a cylindrical packing which is adapted to fluid-tightly connect the sleeve 122 and the filter 72. Reference numeral 130 denotes a holder ring which is adapted to hold the filter 72 in position so as to prevent swaying of the filter 72 in the interior storage space 16.

Referring next to FIGS. 13 through 17, there will be described another embodiment of the present invention, which is identical with the first embodiment of FIGS. 1-6, except the construction of a device for filtering a liquid stored in the interior storage space of the container while the liquid is delivered out of the container.

Namely, the present liquid purifying device has a filtering assembly 132 which is connected to the lower opening of the through-hole 60 through the tube 70. The filtering assembly 132 includes a hollow cylindrical support 34 made of resin, and a micro-porous membrane filter 136 made of resin and supported by the support 134. The filtering assembly 132 is submerged in the liquid 20 in the interior storage space 16, such that an interior space 138 of the support 134 communicates with the through-hole 60 through the tube 70.

The hollow cylindrical support 134 has a boss 142 formed on the upper surface thereof, which boss 142 has a hole 140 formed therethrough, as shown in FIGS. 15 and 16. The support 134 is connected at the boss 142 to the tube 70. Through a cylindrical wall of the support 134, there are formed a multiplicity of slits 146 which extend in the circumferential direction of the support 134, and are equally spaced from each other at a given pitch in the longitudinal direction of the device 132. The cylindrical wall of the support 134 includes a connecting portion 144 which extends in the longitudinal direction of the support 134 such that the circumferentially opposite ends of the slits 146 are defined by the connecting portion 144. Namely, the slits 146 formed through the support 134 circumferentially terminate at the connecting portion 144.

The micro-porous membrane filter 136 is formed from a rectangular film having a size slightly larger than the outer circumferential surface of the hollow support 134 in which the slits 146 are formed. The film of the filter 136 has a porous structure having a multiplicity of pores whose diameters are large enough to permit the liquid 20 to pass therethrough, but are small enough to inhibit the passage of bacteria in the liquid 20 and the air. The filter 136 is processed in a known manner to give the porous structure hydrophilic property, for example.

In the filtering assembly 132, the micro-porous membrane filter 136 is provided on the support 134 so as to cover the portion of the support 134 in which the slits 146 are formed, such that at least a peripheral portion of the filter 136 is secured to the support 134. This membrane filter 136 of the device 132 serves to remove bacteria contained in the the liquid 20 in the interior storage space 16, so that the thus purified liquid 20 is delivered from the outlet of the liquid delivery path, i.e., from the exposed open end of the L-shaped passage 80 of the dispensing head 68.

Generally, the diameter of the pores of the micro-porous membrane filter 136 may be suitably determined depending upon the required degree of purity of the liquid 20.

The hollow cylindrical support 134 may be made of a resin material which contains fluorine, polysulfon or polypropylene, for example. In particular, it is economical to employ polypropylene contained resin as a material for the support 134.

The material for the micro-porous membrane filter 136 may be selected from a variety of materials including fluorine, polypropylene, polyethyl, polysulfon, triacetyl cellulose, and nylon, depending upon the kind of the liquid 20 and the required capability of removing bacteria. Generally, it is preferable in terms of heat resistance, cost and liquid permeability, for example, to prepare the filter 136 from a porous membrane made of polysulfon.

While the present invention has been described in its presently preferred embodiments, for illustrative purpose only, it is to be understood that the invention is by no means limited to the details of the illustrated embodiments, but may be otherwise embodied.

While the L-shaped groove 42 having the lateral portion 40, and the screw member 46 constitute means for holding the air pumping means (cylinder member 36) in the fully retracted position in the illustrated embodiments, any other means having various engaging arrangements may be employed for this purpose.

Figure 18:
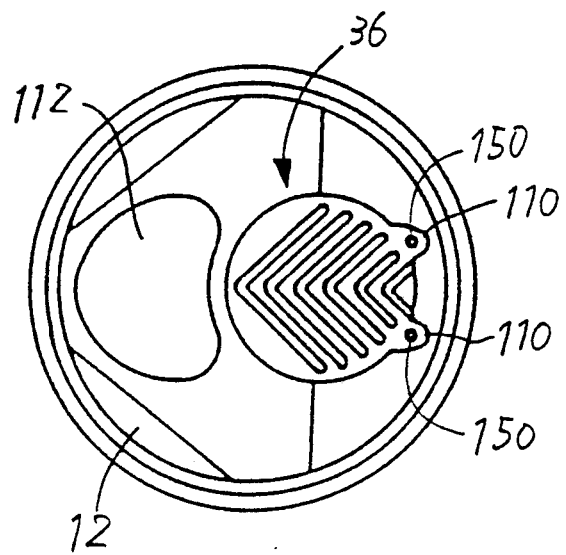
FIG. 18 is a top plan view, corresponding to that of FIG. 10, depicting an upper surface of a lid body of a still further embodiment of the liquid purifying device of the invention.
Figure 19:
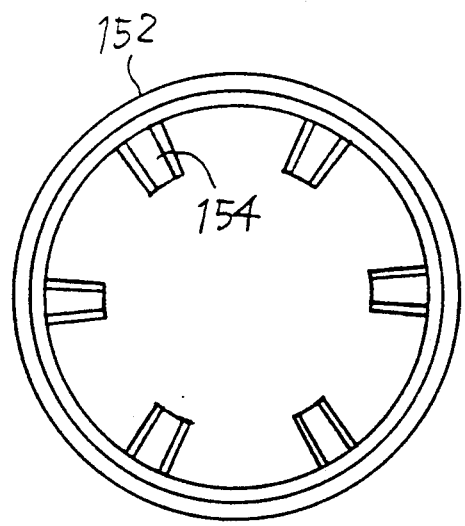
FIG. 19 is a bottom plan view depicting a lower surface of a top cap used in the device of FIG. 18.

In the second embodiment of FIGS. 7 through 12, the cylinder member 36 is rotated by finger-manipulating the tabs 110 formed on the member 36 while the engaging pin 44 of the screw member 46 is in engagement with the lateral portion 40 of the L-shaped groove 42. However, the cylinder member 36 may be otherwise rotated. Namely, the tabs 110 may have respective protuberances 150 formed thereon, as shown in FIG. 18. The lid body 12 with the cylinder member 36 is covered by a top cap 152 similar to the top cap 90 as used in the second embodiment. This top cap 152 has a plurality of protrusions 154 which are formed on a peripheral portion of the inner surface of the top wall thereof, such that the protrusions 154 are equally spaced from each other at a predetermined pitch, as shown in FIG. 19. When the top cap 152 is placed on the lid body 12 and rotated relative to the lid body 12, at least one of these protrusions 154 is brought into engagement with any one of the protuberances 150 on the tabs 110, whereby the cylinder member 36 is rotated with the top cap 152.

More specifically, the cylinder member 36 is rotated in one of opposite circumferential directions so that the engaging pin 44 engages the lateral portion 40 of the groove 42, for locking the cylinder member 36 in the fully retracted position against the biasing force of the spring 58. The cylinder member 36 is rotated in the other circumferential direction to permit the engaging pin 44 to slide in the vertical portion 38 of the groove 42, for moving the member 36 to the fully advanced position under the biasing force of the spring 58. In these cases, the cylinder member 36 may be easily rotated with a relatively small torque applied to the top cap 152, which has the protrusions 154 engageable with the protuberances 150. Further, the top cap 152 covering the lid body 12 may be moved with the cylinder member 36 during the air pumping operation or when the cylinder member 36 is pushed down and then rotated for locking in the fully retracted position. That is, the top cap 152 provides a relatively large operating area for operating the cylinder member 36.

In the liquid purifying devices as illustrated in FIGS. 1 through 19, it is possible to use a plastic material containing anti-bacterial or anti-microbial zeolite, for forming at least one of the components of the device which define a part of the liquid delivery path between the second valve means and the outlet of the path, for example, between the annular packing 120 and the opening of the nozzle 115 in the second embodiment of FIGS. 7-12. More specifically described with respect to the second embodiment by way of illustration, at least one or all of the nozzle 115, connecting member 116, spring seat 118, and lid body 12, which cooperate to define the above-indicated part of the liquid delivery path, may be formed of the anti-bacterial plastic material indicated above. In particular, it is desirable that at least the nozzle 115 is formed of the anti-bacterial plastic material. In this case, bacteria or microorganisms which enter the liquid delivery path through the liquid delivery outlet (nozzle 115) may be destroyed due to their contact with the components formed of the anti-bacterial plastic material. In this respect, it is to be noted that the part of the liquid delivery path between the second valve means and the opening of the nozzle 115 has a relatively small cross sectional area, and therefore is able to provide a considerably high sterilizing effect for a fluid flowing therethrough. Thus, the liquid delivery path may be maintained under sterilized condition.

The anti-bacterial zeolite contained in the plastic material is prepared from natural or synthetic zeolite which is characterized by an alminosilicate tetrahedral framework, and is represented by the following formula: $xM_2/nO.Al_2O_3.ySiO_2.zH_2O$, where M: ion-exchangeable cations and n: valency. The antibacterial zeolite is prepared by replacing a part or all of the ion-exchangeable cations (M) contained in the natural or synthetic zeolite, with anti-bacterial metal ions such as ions of silver, copper, zinc, tin, or bismuth, preferably, silver, copper or zinc, and more preferably such anti-bacterial metal ions and ammonium ions. For example, Sinanen super Zeomic available from Shinanen New Ceramic Co., Ltd. may be used as the anti-bacterial zeolite described above.

The plastic material to which the anti-bacterial zeolite is added may be selected from any materials which can be molded into a desired shape. For example, any one of EVA resin, polyvinyl chloride, fluororesin, polysulfon resin, polyethylene, polycarbonate resin, polypropylene resin, acrylic resin, polystylene, polyacetal resin, and polyamide resin may be used as the plastic material.

The above-indicated anti-bacterial zeolite is mixed into the selected plastic material by a known method, to provide an anti-bacterial plastic material. The content of the anti-bacterial zeolite is normally held in a range of 0.01%–30%, preferably, in a range of 0.1%–10%. To assure uniform dispersion of anti-bacterial zeolite particles in the plastic material, there is first prepared a masterbatch which contains a high proportion of anti-bacterial zeolite, by using a solvent, for example, and then a suitable amount of the masterbatch is mixed into the plastic material such that the content of the zeolite is adjusted to a desired value.

The plastic material containing the anti-bacterial zeolite may be molded by any known technique, preferably, by injection molding. The conditions for the injection molding are suitably determined depending upon a specific kind of the plastic material. Generally, the plastic material is injection-molded at a temperature of about 150°–400° C., under a pressure of about 400–1000 kg.

EXAMPLE

Initially, a mass of masterbatch was prepared in which polysulfon is uniformly mixed with 20% of an anti-bacterial zeolite (Shinanen super Zeomic available from Sinanen New Ceramic Co., Ltd). By using this masterbatch, there were prepared two specimens of polysulfon material which contain 3% and 5% of the anti-bacterial zeolite, respectively. The anti-bacterial zeolite used in this example was obtained from A-type zeolite whose ion-exchangeable cations are replaced by silver and zinc ions, and which contains 2.5% of silver and 14% of zinc.

Then, the two specimens of the anti-bacterial polysulfon material were used to form, by injection molding, the nozzle 115, connecting member 116 and spring seat 118 of the liquid purifying device 96 as shown in FIGS. 7-12. For comparison, the same components 115, 116, 118 of the device 96 were formed of a polysulfon material which contains no anti-bacterial zeolite. The injection molding was effected at 340° C., under an injection pressure of 800 kg/cm$^2$.

Each of the components 115, 116, 118 formed of the above-indicated plastic materials was observed at its surface by an electronic microscope of 1,000 magnifications. As a result, some particles which are considered those of anti-bacterial zeolite were found on the surfaces of the components formed of the anti-bacterial plastic materials.

Subsequently, some specimens of the liquid purifying device 96 as shown in FIG. 7 were fabricated by using at least one of the components 115, 116, 118 indicated above, and were tested on anti-bacterial or sterilizing effects of these components in the following manner. The result of the test was indicated in TABLE 1 below.

ANTI-BACTERIAL EFFECT TEST

After disinfecting the container body 10 of the device 96 by using boiling water, a sterilized physiological salt solution was introduced in a sterile condition into the container body 10. On the other hand, cells of Escherichia coli, Staphylococcus aureus or Pseudomonas aeruginosa were mixed into another physiological salt solution, to prepare a specimen liquid containing $10^5$–$10^6$ per ml of live cells (bacteria) of each kind. Then, 0.1 ml of the specimen liquid was injected in a sterile condition by a sterilized injector, into the liquid purifying device 96, through the nozzle 115. After the injection of the cells, the liquid purifying device 96 was maintained at 35° C., with the container body 10 covered by the top cap 90. Three and seven days later, the interior space of the container body 14 was pressurized by operating the cylinder member 36, and then the dispensing head 112 was depressed so as to dispense 5 ml of a liquid from the container body 10, into a sterilized test tube. The thus dispensed liquid was observed on its contamination by the injected germs, by counting the number of the live germs contained therein.

It will be understood from TABLE 1 below that the liquid purifying device including the components containing anti-bacterial zeolite was able to dispense a substantially sterilized liquid which had a considerably reduced number of the germs, and which contained no cells of *Escherichia coli* and *Pseudomonas aeruginosa*, three days after the injection of the germs. The liquid dispensed from the device seven days after the injection was also free of *Staphylococcus aureus*, and the liquid delivery path of the device partially defined by the anti-bacterial components had no germs left therein, and was held in a sterile condition. In the liquid purifying device having no anti-bacterial components, on the other hand, a large number of live germs were found in the liquid dispensed from the device, both three days and seven days after the injection of the germs. Thus, it was recognized that the liquid delivery path of this device was contaminated or infected by the germs injected through the nozzle 115.

TABLE 1

| Germs | Content of Anti-bacterial Zeolite | Number of Injected Cells/mil | Number of Live Cells/ml 3 days | Number of Live Cells/ml 7 days | Components Containing Anti-bacterial Zeolite |
|---|---|---|---|---|---|
| Escherichia coli | 3% | $1.06 \times 10^5$ | 4 | 0 | nozzle, |
| | 5% | | 0 | 0 | connecting member, |
| | 0% | | $2.70 \times 10^4$ | $5.12 \times 10^2$ | and spring seat |
| Staphylococcus aureus | 3% | $5.30 \times 10^4$ | $4.63 \times 10^2$ | 0 | nozzle, |
| | 0% | | $9.52 \times 10^2$ | $4.6 \times 10$ | connecting member, and spring seat |
| Pseudomonas aeruginosa | 3% | $8.00 \times 10^4$ | 0 | 0 | nozzle, and |
| | 5% | | 0 | 0 | spring seat |
| | 0% | | $2.50 \times 10^2$ | $1.01 \times 10^3$ | |

What is claimed is:

1. A liquid purifying device for dispensing a liquid, comprising:
   a container having an interior space for storing said liquid, said container including a lid member for fluid-tightly closing an opening of said interior space;
   air pumping means provided on said lid member, for passing air through an air inlet passage thereby introducing compressed air into said interior space, said air pumping means including a cylinder member which is reciprocated between a fully advanced position in which said cylinder member protrudes from said lid member, and a fully retracted position in which said cylinder member is received in said lid member;
   biasing means for biasing said cylinder member toward said fully advanced position;
   holding means for holding said cylinder member in said fully retracted position against a biasing force of said biasing means;
   first valve means disposed in said air inlet passage, for permitting a supply flow of said air therethrough into said interior space to raise a pressure within said interior space, and for inhibiting a discharge flow of said compressed air and said liquid therethrough out of said interior space;
   a liquid delivery path which extends through said lid member so as to communicate at one end thereof with aid interior space and at the other end with an exterior space of the container, said liquid being delivered out of said interior space through said liquid delivery path, due to the pressure of said compressed air within said interior space;
   filtering means disposed in said liquid delivery path and submerged in said liquid, for filtering said liquid to remove bacteria from said liquid delivered through said liquid delivery path;
   second valve means disposed in a portion of said liquid delivery path which is downstream of said filtering means, as viewed in a direction of delivery of said liquid, said second valve means having a closed and an open position for closing and opening the liquid delivery path, respectively; and
   dispensing means for operating said second valve means between said closed and open positions, said dispensing means comprising a push-operated member received in said lid member and having an operating surface exposed to said exterior space of said contaerin,
   wherein said lid member has an annular groove, and said cylinder member is received in said annular groove such that said cylinder member is movable relative to said lid member, between said fully retracted position and said fully advanced position.

2. A liquid purifying device according to claim 1, wherein said holding means comprises an engaging member fixed to said lid member, and an L-shaped groove formed in an outer circumferential surface of said cylinder member, said cylinder member being held in said fully retracted position when said engaging member engages a lateral portion of said L-shaped groove.

3. A liquid purifying device according to claim 1, wherein said cylinder member comprises a bottom wall having an air inlet which communicates with said air inlet passage when said cylinder is moved from said fully retracted position to said fully advanced position.

4. A liquid purifying device according to claim 1, wherein said lid member has a shoulder surface partially defining said air inlet passage, and said first valve means comprises a ball and a spring, said ball being normally pressed against said shoulder surface under a biasing force of said spring, so as to close said air inlet passage.

5. A liquid purifying device according to claim 1, wherein said lid member has a shoulder surface partially defining said air inlet passage, and said first valve means comprises an elastic disc and a retainer for supporting said elastic disc, said elastic disc being displaceable between a closed position in which said elastic disc contacts said shoulder surface to close said air inlet passage, and an open position in which said elastic disc is spaced away from said shoulder surface to open said air inlet passage.

6. A liquid purifying device according to claim 1, wherein said lid member has a shoulder surface partially defining said liquid delivery path, and said second valve means comprises a ball and a spring, said ball being normally forced against said shoulder surface under a biasing force of said spring so as to close said liquid delivery path.

7. A liquid purifying device according to claim 1, wherein said lid member has a shoulder surface partially defining said liquid delivery path, and said second valve means comprises a packing and a spring, said packing being normally forced against said shoulder surface under a biasing force of said spring so as to close said liquid delivery path.

8. A liquid purifying device according to claim 1, further comprising means for preventing said push-operated member of said dispensing means from being operated to move said second valve means to said open position.

9. A liquid purifying device according to claim 1, wherein said filtering means comprises a micro-porous membrane which consists of an array of micro-porous hollow fibers.

10. A liquid purifying device according to claim 1, wherien at least a portion of said liquid delivery path between said other end and said second valve means is defined by said lid member, said dispensing means and said second valve means, at least one of which is formed of a plastic material containing anti-bacterial zeolite.

11. A liquid purifying device according to claim 1, wherien said liquid delivery path includes a through-hole formed throughs aid lid member, said push-operating member of said dispensing means being received in an upper portion of said through-hole.

12. A liquid purifying device according to claim 11, wherein said liquid delivery path further includes an L-shaped passage formed through said push-operated member, said L-shaped passage including a vertical portion which communicates with said through-hole, and a lateral portion which is open to said exterior space.

13. A liquid purifying device according to claim 11, wherein said liquid delivery path further includes a nozzle aperture which is open to said exterior space, through an outer surface of said lid member.

14. A liquid purifying device according to claim 1, wherein said filtering means comprises a planar micro-porous membrane having a multiplicity of pores whose diameters are determined so as to permit passage of said liquid therethrough but inhibit passage of bacteria therethrough.

15. A liquid purifying device according to claim 14, wherein said filtering means further comprises a cylindrical support for supporting said planar micro-porous membrane, said support having a plurality of slits formed through a cylindrical wall thereof in a circumferential direction thereof, said planar micro-porous membrane being fixed to said support so as to cover said slits, said support having an interior space which communicates with said liquid delivery path.

16. A liquid purifying device according to claim 1, further comprising a top cap for covering said lid member, said top cap having a top wall which faces an upper surface of a bottom wall of said cylinder member.

17. A liquid purifying device according to claim 16, wherein said cylinder member has at least one protuberance formed on said upper surface, while said top cap has at least one protrusion formed on a lower surface of said top wall thereof, said cylinder member being rotated with said top cap when at least one of said at least one protrusion is held in engagement with at least one of said at least one protuberance.

* * * * *